United States Patent

Cattanach

[15] 3,699,182

[45] Oct. 17, 1972

[54] SELECTIVE SEPARATION BY A CHROMATOGRAPHIC PROCESS

[72] Inventor: John Cattanach, Glassboro, N.J.

[73] Assignee: Mobil Oil Corporation

[22] Filed: Dec. 5, 1969

[21] Appl. No.: 882,692

[52] U.S. Cl..................260/674 SA, 55/67, 208/310, 260/67 MS

[51] Int. Cl..................................................C07c 7/12

[58] Field of Search....260/674 SA, 676 MS, 666 SA, 260/677; 208/310; 55/67

[56] References Cited

UNITED STATES PATENTS

| | | | |
|---|---|---|---|
| 2,956,089 | 10/1960 | Mattox et al. | 260/676 |
| 3,468,791 | 9/1969 | Epperly et al. | 208/310 |
| 3,437,590 | 4/1969 | Asher | 208/310 |
| 3,114,782 | 12/1963 | Fleck et al. | 260/674 |
| 3,133,126 | 5/1964 | Fleck et al. | 260/674 |
| 3,126,425 | 3/1964 | Eberly et al. | 260/674 |
| 3,308,069 | 3/1967 | Wadlinger et al. | 252/455 |

*Primary Examiner*—Delbert E. Gantz
*Assistant Examiner*—C. E. Spresser
*Attorney*—Oswald G. Hayes and Andrew L. Gaboriault

[57] ABSTRACT

A class of novel crystalline aluminosilicates generally identified as ZSM–5 type and having unique molecular sieving properties are utilized as selective sorbents in a chromatographic process. The effective portals in these zeolites are apparently elliptically shaped with effective major and minor axis of about 7.0 ± 0.7A and 5.0 ± 0.5A, respectively. This unique shape is utilized to provide "keyhole" molecular sieving action which is particularly useful for separating specific members of closely-related chemical compounds. A preferred embodiment is the selective separation of disubstituted hydrocarbons such as dialkyl aromatics. The process of this invention is particularly useful for separating $C_8$ aromatic mixtures. A particularly preferred embodiment is the separation of p-xylene from a mixture of the same with o-xylene and/or m-xylene and/or ethylbenzene.

11 Claims, No Drawings

SELECTIVE SEPARATION BY A CHROMATOGRAPHIC PROCESS

FIELD OF THE INVENTION

This invention relates to novel separation processes with a unique class of crystalline aluminosilicates of the ZSM—5 type hereinafter more fully described and a specific embodiment includes the selective separation of disubstituted aromatic isomers from a mixture of the same with other isomers.

DESCRIPTION OF THE PRIOR ART

It has long been known that certain porous substances such as silica gel, activated char, and indeed zeolites, have certain selective absorption characteristics useful in resolving a hydrocarbon mixture into its component parts. Thus, silica gel is selective in removing aromatic hydrocarbons from non-aromatic hydrocarbons and activated chars are useful in separating olefins from mixtures with paraffins. Similarly, the molecular sieve properties of zeolites can be utilized to selectively remove one molecular species from a mixture of the same with other species.

Although a wide variety of zeolitic materials, particularly crystalline aluminosilicates, have been successfully employed in various separation schemes, nevertheless, these prior art processes, in general, fell into one or two main categories. In one type a zeolite was employed having a pore size sufficiently large to admit the vast majority of components normally found in a process stream. These molecular sieves are referred to as large pore zeolites and they are generally stated to have a pore size of about 13A such as zeolite X, Y, and L. The other type of crystalline aluminosilicates are those having a pore size of approximately 5A which are utilized to separate small molecules such as n-paraffins to the substantial exclusion of other molecular species.

There are many separations, however, that the porous absorbents of the prior art are not capable of making efficiently. For instance, it would be highly desirable to separate closely-boiling aromatics, particularly the $C_8$ aromatic mixture. Paraxylene, in particular, is required in a very high state of purity for the manufacture of terephthalic acid which is an intermediate in the manufacture of synthetic fibers such as "Dacron". Normally it is separated from a product stream containing ethylbenzene, m-xylene and o-xylene by costly superfractionation and multistage refrigeration steps. This process involves high operating costs and has a limited yield.

Another proposed solution to this problem is set forth in U.S. Pat. No. 3,126,425. This patent discloses contacting a mixture of xylene isomers with crystalline aluminosilicates such that the ortho and meta isomers are sorbed by said aluminosilicates and the para isomer is concentrated in the unabsorbed portion.

The above method is concerned with the concentration of the more symmetrical disubstituted aromatic isomer, such as p-xylene, in the unadsorbed stream. It therefore apparently represents an extension of the normal relative partitioning of xylene isomers with high surface area solids to the more selective crystalline aluminosilicate surface. All of the isomers described in the above patent will be sorbed by crystalline aluminosilicates having uniform pore opening of 10–13 Angstrom units. The separations shown are therefore not dependent of the molecular sieving properties of the 13 Angstrom zeolite, but rather, on the relative partitioning of the said isomers between the intracrystalline sorbed phase and the free liquid phase. This method is therefore severely limited and may as stated be restricted because of economic considerations to processing only streams containing 50 percent or more para-xylene. The normal concentration of p-xylene in equilibrium mixtures of xylene isomers obtained from commercial isomerization units is generally about 24 weight percent so that this method will not accomplish the desired separation on feeds such as this.

DESCRIPTION OF THE INVENTION

It has now been discovered that unique selective separations can be achieved by utilizing a unique class of crystalline aluminosilicates which possess unique molecular sieving properties in that they allow entry and egress to their internal pore structure of not only normal paraffins but also of slightly branched paraffins and yet have the ability to effectively exclude paraffins possessing quarternary carbon atoms at short contact times. These zeolites also possess the ability of selectively sorbing simple, lightly-substituted monocyclic hydrocarbons from mixed hydrocarbon streams containing highly-substituted monocyclic, polycyclic or heterocyclic or even simple polycyclic hydrocarbons. These zeolites also possess the unique property of selectively sorbing 1,4-disubstituted aromatic compounds in admixture with 1,2-, 1,3-, or more highly substituted aromatic hydrocarbons. Para-xylene, for example, can be selectively separated from ortho- and meta-xylene by contacting said mixture with this unique class of zeolites.

As has heretofore been stated, all the crystalline aluminosilicate materials heretofore employed in prior art processes fell into one of two general types — the small-pore zeolites having pore sizes of about 5A and the large-pore zeolites having pore sizes of about 13A. The small port aluminosilicates were generally stated to be shape selective in that they allowed selective separation of normal aliphatic compounds from a mixture of the same with isoaliphatic compounds and cyclic compounds. The second class of zeolites, i.e., those having a pore size of 13A were generally stated to be non selective since all of the molecules normally found in a hydrocarbon feed stream are able to enter the internal pore structure. Separations by the large pore zeolites are therefore generally restricted to relative partitioning of sorbate molecules within the intracrystalline void volume according to the relative polarity of the sorbate molecules.

The novel separation schemes of the invention are predicated upon using zeolitic materials which allow selective separations to be achieved depending on either the size, shape or polarity of the sorbate molecules. This class of novel crystalline aluminosilicates can generally be stated to have intermediate shape-selective sorption properties. The unique nature of this novel class of zeolites is characterized by the presence of uniform pore openings which are apparently elliptical rather than circular in nature. The effective pore openings of this unique class of zeolites have both a major and minor axis, and it is for this reason that the unusual and novel molecular sieving effects are achieved. The unique type of molecular sieving produced has generally be referred to as a "-keyhole" molecular sieving action. From their dynamic molecular sieving properties it would appear that the major and minor axis of the elliptical pore in this family of zeolites have effective sizes of about 7.0 ± 0.7A and 5.0 ± 0.5A, respectively.

The family of ZSM–5 type compositions, useful in the novel process of this invention, has the characteristic X-ray diffraction pattern set forth in Table 1, hereinbelow. ZSM–5 compositions can also be identified, in terms of mole ratios of oxides, as follows:

$$0.9 \pm 0.2\ M_{2/n}O : W_2O_3 : 5\text{–}100\ YO_2 : z\ H_2O$$

wherein M is a cation, *n* is the valence of said cation, W is selected from the group consisting of aluminum and gallium, Y is selected from the group consisting of silicon and germanium, and Z is from 0 to 40. In a preferred synthesized form, the zeolite has a formula, in terms of mole ratios of oxides, as follows:

$0.9 \pm 0.2\ M_{2/n}O : Al_2O_3 : 5\text{–}100\ SiO_2 : z\ H_2O$ and M is selected from the group consisting of a mixture of alkali metal cations, especially sodium, and tetraalkylammonium cations, the alkyl groups of which preferably contain 2–5 carbon atoms.

In a preferred embodiment of ZSM–5, W is aluminum, Y is silicon and the silica/alumina mole ratio is at least 10 and ranges up to about 60.

Members of the family of ZSM–5 zeolites possess a definite distinguishing crystalline structure whose X-ray diffraction pattern shows the following significant lines:

TABLE I

| Interplanar Spacing *d*(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintillation counter spectrometer with a strip chart pen recorded was used. The peak heights, I, and the positions as a function of 2 times theta, where theta is the Bragg angle, were read from the spectrometer chart. From these, the relative intensities, 100 I/I, where I is the intensity of the strongest line or peak, and d (obs.), the interplanar spacing in A, corresponding to the recorded lines, were calculated. In Table I the relative intensities are given in terms of the symbols S = strong, M = medium, MS = medium strong, MW = medium weak and VS = very strong. It should be understood that this X-ray diffraction pattern is characteristic of all the species of ZSM–5 compositions. Ion exchange of the sodium ion with other cations reveals substantially the same pattern with some minor shifts in interplanar spacing and variation in relative intensity. Other minor variations can occur depending on the silicon to aluminum ratio of the particular sample, as well as if it had been subjected to thermal treatment. Various cation exchanged forms of ZSM–5 have been prepared. X-ray powder diffraction patterns of several of these forms are set forth below. The SZM–5 forms set forth below are all aluminosilicates.

TABLE 2

X-Ray Diffraction ZSM–5 Powder in Cation Exchanged Forms *d* Spacings Observed

| As Made | HCl | NaCl | $CaCl_2$ | $RECl_3$ | $AgNO_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 4.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.86 | 2.87 | 2.87 | 2.87 | 2.87 | 2.87 |
| 2.80 | — | — | — | — | — |
| 2.78 | — | — | 2.78 | — | 2.78 |
| 2.73 | 2.75 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | — | — | 2.38 | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.20 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | 2.10 | 2.10 | — |

| | | | | | |
|---|---|---|---|---|---|
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.47 | 1.57 | — | 1.57 | 1.57 |
| — | — | 1.56 | 1.56 | 1.56 | — |

Zeolite ZSM–5 can be suitably prepared by preparing a s solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 3

| | Broad | Preferred | Particularly Preferred |
|---|---|---|---|
| $OH^-/SiO$ | 0.07–1.0 | 0.1–0.8 | 0.2–0.75 |
| $R_4N+/(R_4N^++Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–50 |

wherein R is propyl, W is aluminum or gallium and Y is silicon or germanium maintaining the mixture until crystals of the zeolite are formed. Thereafter, the crystals are separated from the liquid and recovered. Typical reaction conditions consist of heating the foregoing reaction mixture to a temperature of from about 90°to 200°C for a period of time of from about 6 hours to 60 days. A more preferred temperature range is from about 100°to 175°C with the amount of time at a temperature in such range being from about 12 hours to 8 days.

The digestion of the gel particles is carried out until crystals from. The solid product is separated from the reaction medium, as by cooling the whole to room temperature, filtering, and water washing.

The foregoing product is dried, e.g., at 230°F, for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetraproplammonium hydroxide. It will be understood that each oxide component utilized in the reaction mixture for preparing a member of the ZSM–5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM–5 composition will vary with the nature of the reaction mixture employed. ZSM–5 is disclosed and claimed in Ser. No. 865,472, filed Oct. 10, 1969.

Another operable zeolite falling within the above class is zeolite ZSM–8 which is described and claimed in Ser. No. 865,418, filed Oct. 10, 1969. 865,472, ZSM–8 can also be identified, in terms of mole ratios of oxides, as follows:

$$0.9 \pm 0.2\ M_{2/n}O : Al_2O_3 : 5\text{–}100\ SiO_2 : z\ H_2O$$

wherein M is at least one cation, $n$ is the valence thereof and $z$ is from 0 to 40. In a preferred synthesized form, the zeolite has a formula, in terms of mole ratios of oxides, as follows:

$$0.9 \pm 0.2\ M_{2/n}O : Al_2O_3 : 10\text{–}60\ SiO_2 : z\ H_2O$$

and M is selected from the group consisting of a mixture of alkali metal cations, especially sodium, and tetraethylammonium cations.

ZSM–8 possesses a definite distinguishing crystalline structure having the following X-ray diffraction pattern:

TABLE 4

| dA° | $I/I_o$ | $I/I_o$ | dA° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 4 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM–8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$ — from about 10 to about 200

$Na_2O$/tetraethylammonium hydroxide — from about 0.05 to 0.20

Tetraethylammonium hydroxide/$SiO_2$ — from about 0.08 to 1.0

$H_2O$/tetraethylammonium hydroxide — from about 80 to about 200

Thereafter, the crystals are separated from the liquid and recovered. Typical reaction conditions consist of heating the foregoing reaction mixture to a temperature of from about 100° to 175°C for a period of time of from about 6 hours to 60 days. A more preferred temperature range is from about 150° to 175°C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230°F, for from about 8 to 24 hours. Of course, milder conditions may be employed if desired, e.g., room temperature under vacuum.

ZSM-8 is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide Salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolites are then preferably washed with water and dried at a temperature ranging from 150° to about 600°F and thereafter calcined in air or other inert gas at temperatures ranging from about 500° to 1,500°F for periods of time ranging from 1 to 48 hours or more.

Prior to use, the zeolites should be dehydrated at least partially. This can be done by heating to a temperature in the range of 200° to 600°C in an atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

The novel process of this invention is applicable to the separation of specific compounds and classes of compounds from mixtures of the same with other compounds. In order to aid in pointing out the separations which can be accomplished by the instant process Table 5 is presented. This table lists in column A those compounds or classes of compounds which can be separated from mixtures of the same with other compounds or classes of compounds listed in column B. For convenience, columns A and B are further sub-divided into three parts, i.e., 1, 2 and 3 to depict those separations which are most usually encountered.

TABLE 5

| A | B |
|---|---|
| 1. Alkyl substituted non-quarternary carbon containing paraffins or olefins. | 1. Compounds having a quaternary carbon atom |
| 2. Benzene; $C_6$ naphthenes: mono-substituted non-quarternary carbon containing alkyl benzenes and naphthenes; and non-quarternary carbon atom containing alkyl 1,4 disubstituted aromatics and naphthenes | 2. Polysubstituted aromatics and naphthenes; and polycyclic aromatics and naphthenes |
| 3. Unsubstituted; non-quarternary carbon atom containing para-substituted and non-quarternary carbon atom containing para, para' disubstituted biphenyls | 3. Other substituted biphenyls |

Thus, from the above table it can be seen that the materials listed under A1 are usually separated from mixtures of the same with materials listed under B1. It is to be understood, however, that any material listed under A can be separated from any material listed under B. In some cases it is even possible to make a separation between two or more compounds listed under A, although separation of this type are not usually made.

Examples of compounds of the A1 type include 2-methylbutane, 2-methylpentane, 3-methylpentane, 2,3-dimethyl-butane, 2-methylhexane, 3-methylhexane, 2,3-dimethylpentane, 3,4-dimethylpentane, 2-methylheptane, 3-methylheptane, 4-methylheptane, 2,4-dimethylhexane, 2,3-dimethylhexane, 2,5-dimethylhexane, 3,4-dimethylhexane, 2,3,4-trimethylpentane, 3-methylhexene1, 4-methylhexene-1, 3,4-dimethyl hexene-1, 4-methylhexene-2. Examples of compounds of the B1 type include 2,2-dimethylpropane, 2,2-dimethylbutane, 2,2-dimethylpentane, 3,3-dimethylpentane, 2,2,3-trimethylbutane, 2,2-dimethylhexane, 3,3-dimethylhexane, 2,2,3-trimethylpentane, 2,2,4-trimethyl-pentane, 2,3,3-trimethylpentane, 2,2,3,3-tetramethylbutane, 3,3-dimethylhexene-1, 4,4-dimethylhexene-1, 3,3,4-trimethylhexene-1, 3,3-dimethylbutane-1.

Examples of compounds of the A 2 type include benzene, cyclohexane, toluene, ethyl benzene, methyl cyclohexane, propyl benzene para-xylene, 1,4-diethyl benzene, 1-ethyl-4-methyl benzene, 1,4-dimethyl cyclohexane, methyl cyclopentane, 1-methyl-4-ethyl cyclohexane, 1-propyl-4-ethyl benzene, 1-hexyl-4-ethyl benzene.

Examples of compounds of the B2 type include o-xylene, m-xylene, 1,2-diethyl benzene, 1,3-diethyl benzene, 1-propyl-3-hexyl benzene, 1-ethyl-2-propyl, 1,3,5-trimethyl benzene, 1,2,4-triethyl benzene, 1,3,5-triethyl cyclohexane, 1,1,4-tripropyl cyclopentane, decalin, anthracene, phenanthrene.

Examples of compounds of the A3type include biphenyl, 4-methyl biphenyl, 4-ethyl biphenyl, 4-hexyl biphenyl, 4,4′-dimethyl biphenyl, 4-methyl-4′-ethyl biphenyl.

Examples of compounds of the B3 type include 3,3′-dimethyl biphenyl, 5-ethyl-3′-hexyl biphenyl, 2,3,3′-trimethyl biphenyl, 2,2′-diethyl biphenyl.

As has heretofore been stated compounds of the A1 type are usually separated from a mixture of the same with at least one compound of the B1 type. In like manner compounds of A2 are usually separated from a mixture of the same with B2 and A3 from B3. In this connection, a preferred utilization of the novel chromatographic process of this invention resides in the resolution of a mixture of isomers since, in general, this type of separation is difficult to accomplish by conventional techniques. Thus, for example, 2,4-dimethyl pentane can be separated from 3,3-dimethyl pentane. The most preferred embodiment of this invention resides in the separation of a mixture of $C_8$ aromatics particularly the separation of para-xylene from a mixture of the same with ortho xylene and/or meta-xylene and/or ethyl benzene.

As has been stated, the separation process of this invention is a chromatographic one. This is intended to describe a process wherein separation is based on selective adsorption of at least one component of a mixture by a solid. The solid is the ZSM–5 type zeolite previously described.

The novel chromatographic separation process of this invention is carried out merely by contacting a hydrocarbon mixture, above-described, existing either as a gas, liquid or mixed phase with a crystalline zeolite of the ZSM–5 type such that the desired component is concentrated in either the absorbed or non-absorbed phase. A suitable fluid carrier can be employed if such is desired. Typical carriers include polar and non polar compounds such as nitrogen, air, water, hydrocarbons, helium, etc. The process can be carried out in either a batch or a continuous operation. The sorbed material can be subsequently recovered by conventional desorbing techniques such as thermal stripping, stripping with an inert gas, e.g., nitrogen, helium, etc. or evacuation of elutriation with a suitable polar or non-polar stripping agent, e.g., water, n-hexane, etc.

The temperature at which the separation is carried out is important. It can be stated that the novel process of this invention can be carried out at temperatures ranging from about −50 ° to about 400°C. It is noted that higher temperatures can be employed but because of possibility of catalytic conversion, 400°C appears to be a suitable upper limit. A more preferred temperature range appears to be between about 25° to 300°C. It is noted that the above temperatures might vary slightly depending upon the particular cationic form of the crystalline aluminosilicate employed but, in general, they represent operable parameters for carrying out the novel process of this invention.

In another embodiment of this invention, it is desired to incorporate the ZSM–5 type zeolite with another material resistant to the temperatures and other conditions employed in the separation processes. Such matrix materials include synthetic or naturally occurring substances as well as inorganic materials such as clays, silica and/or metal oxides. The latter may be either naturally occurring or in the form of gelatinous precipitates or gels including mixtures of silica and metal oxides.

Naturally occurring clays which can be composited with the ZSM–5 type zeolite include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM–5 type zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM–5 and inorganic oxide gel matrix vary widely with the crystalline aluminosilicate content ranging from about 1 to about 99 percent by weight and more usually, particularly when the composite is prepared in the form of beads in the range of about 40 to about 90 percent by weight of the composite.

Another embodiment of this invention resides in subjecting the zeolite ZSM–5 type to a mild steam treatment carried out at elevated temperatures of 800° to 1,500°F and preferably at temperatures of about 1,000° to 1,400°F. The treatment may be accomplished in an atmosphere of 100 percent steam or in atmosphere consisting of steam and a gas which is substantially inert to the aluminosilicate. The steam treatment apparently provides beneficial properties in the aluminosilicate compositions and can be conducted before, after or in place of the calcination treatment.

A similar treatment may be accomplished at lower temperatures and elevated pressures, e.g., 350°–700°F at 10 to about 200 atmospheres.

The following examples will illustrate the best mode contemplated for carrying out the present invention.

EXAMPLES 1–4

Typical preparations of ZSM–5 type zeolites are shown in these examples. Examples 1–3 show the preparation of the hydrogen form ZSM–5 and they involve the use of tetrapropyl-ammonium hydroxide (TPAOH) or bromide (TPABr). Example 4 shows a typical preparation of the hydrogen form ZSM–8 using tetraethyl ammonium hydroxide (TEAOH). Reaction conditions and results are shown in Table 6.

TABLE 6

| | 1 | 2 | 3 | 4 |
|---|---|---|---|---|
| Reaction Composition | 30 g $NaAlO_2$<br>720 g Ludox<br>1025 g of 2.2N TPAOH | 281 g Sorbead Fines<br>3.3 lb TPABr Solution | 0.56 lb. $NaAlO_2$<br>44.7 lb Q-Brand<br>5.6 lb TPABr<br>16.7 lb NaCl<br>4.5 lb $H_2SO_4$<br>132.0 lb $H_2O$ | 13 g $NaAlO_2$<br>300 g 40% TEAOH<br>300 g $H_2O$<br>1000 g Ludox |
| Reaction | | | | |
| temp (°C) | 150 | 100 | 100 | 193 |
| time (hr) | 168 | 168 | 327 | 144 |
| | Washed dried at 230°F, calcined 16 hrs at 1000°F | | | |
| Base Exchange | | $NH_4Cl$ Solution | | |
| Conc. (Wt %) | 25 | 5 | 25 | 25 |
| temp. (°C) | 90 | 25 | 90 | 90 |
| contacts | ×3 | ×4 | ×3 | ×3 |
| pelleted calcined | | | | |
| (hr) | 16 | 10 | 16 | 16 |
| (°F) | 1000 | 1000 | 1000 | 1000 |
| steamed | | | | |
| (hr) | 14 | 24 | 14 | 14 |
| (°F) | 1290 | 1200 | 1290 | 1290 |
| (psia) | 15 | 30 | 15 | 15 |
| Chemical Composition (g/100 g.) | | | | |
| Na | 0.08 | 0.23 | 0.02 | <.5 |
| $Al_2O_3$ | 4.7 | 2.2 | 3.0 | 3.0 |
| $SiO_2$ | 96.9 | 95.3 | 94.8 | 95.9 |
| X-ray type | ZSM–5 | ZSM–5 | ZSM–5 | ZSM–8 |

EXAMPLE 5

A column 9 cm long and 3 cm in diameter was packed with 30 grams of ZSM–5 zeolite in the hydrogen form prepared in accordance with the general procedure set forth in Example 1 and maintained at a temperature of 50°C. 8.2 grams of a solution containing 70 wt. % m-xylene and 30 wt. % p-xylene was pumped to the top of the column at a pumping speed of 20 ml/hr and a helium flow of 25 ml/hr was maintained through the column. Fractions were eluted from the column using a helium flow and water was a stripping agent. The eluted fractions were trapped and isolated in cooled (−196°C) glass traps.

Analysis of the initial fraction showed that it was substantially pure m-xylene.

Analysis of the fraction obtained after the addition of 9.7 grams of water at a flow rate of 20 ml/hr showed that it was 98 percent pure p-xylene.

EXAMPLES 6–8

These examples will illustrate selective separation of paraxylene from a solution comprising 24 wt. % p-xylene, 59 wt. % m-xylene and 17 wt. % o-xylene.

In each of Examples 6–8, 50 grams of a zeolite of the ZSM–5 type was contacted with the solution of xylene isomers for 1 hour at a temperature of 25°C. In Example 6 the zeolite employed was then prepared by the general procedure of Example 1. In Example 7, the zeolite employed was that prepared by the general procedure of Example 2, and in Example 8 the zeolite employed was that prepared by the general procedure of Example 4. After contact for one hour, the solution was filtered and the unabsorbed fraction was analyzed. The filter cake containing the sorbed fraction was then washed with 100 grams of mesitylene followed by extraction for 20 hours with 1.5 liters of normal hexane at 50°C. The xylene was recovered by distillation and in each case p-xylene was obtained having a purity greater than 99 percent. A summary of these experiments including detailed analysis is shown in Table 7.

TABLE 7

| Example | 6 | 7 | 8 |
|---|---|---|---|
| Sorbent | | | |
| Type | HZSM–5 (TPAOH) | HZSM–5 (TPABr) | HZSM–8 (TEAOH) |
| Solution | | | |
| Composition (Wt %) | | | |
| p-xylene | 24 | 24 | 24 |
| m-xylene | 59 | 59 | 59 |
| o-xylene | 17 | 17 | 17 |
| Contact Time (hrs) | 1 | 1 | 1 |
| Temp. (°C) | 25 | 25 | 25 |
| Separation | | 15 min filtration | |
| Unadsorbed Fraction | | | |
| Wt of filtrate (g) | 68 | 67 | 66 |
| Composition (Wt %) | | | |
| p-xylene | 17 | 16 | 17 |
| m-xylene | 65 | 66 | 65 |
| o-xylene | 18 | 18 | 18 |
| Sorbed Fraction | | | |
| Wt of Filter Cake (g) | 74 | 73 | 69 |
| Wash | | 100 g of Mesitylene | |
| Extraction Procedure | | 20 hrs Soxhelt extraction (1.5 liter of $nC_6H_{14}$ at 50°C) | |
| Wt of Extract (g) | 230 | 221 | 193 |
| Composition (Wt %) | | | |
| normal hexane | 95 | 94 | 95 |
| xylene isomers | 1 | 1 | 1 |
| mesitylene | 4 | 5 | 4 |
| Wt of Xylene Fraction (g) | 1.8 | 1.8 | 1.7 |
| Composition (Wt %) | | | |
| p-xylene | >99 | >99 | >99 |
| m-xylene | | | |
| o-xylene | | | |
| Grams of p-xylene Recovered/ 100 g Solid | 3.6 | 3.6 | 3.4 |

EXAMPLES 9–16

A 50–50 mixture of various hydrocarbons were passed over a 5 × ⅜ inch column containing 3.8 grams of 30/60 mesh HZSM-8 prepared by the procedure of Example 4. The procedure involved injecting 50 microliters of the various 50/50 mixtures into the column into which was flowing a helium gas stream at a flow rate of 100 ml/min. The various hydrocarbon samples were passed through a preheater zone at 225°C at the column inlet. Elution of the hydrocarbons in the exit helium stream was monitored. The results obtained are shown in Table 8. In each case purities of greater than 90 percent were obtained.

TABLE 8

| | Temp. (°C) | Components mixture | Elution Time sec to sec | Component (>90% purity) |
|---|---|---|---|---|
| 9 | 200 | 2,2-dimethylbutane: 2-methylpentane | 0/30 | 2,2-dimethylbutane |
| | | | 180/300 | 2-methylpentane |
| 10 | 200 | Isooctane: 3-methylpentane | 0/10 | Isooctane |
| | | | 210/360 | 3-methylpentane |
| 11 | 200 | Isooctane: 2,5-dimethylhexane | 0/10 | Osooctane |
| | | | 35/85 | 2,5-dimethylhexane |
| 12 | 200 | Decalin: cyclohexane | 0/6 | Decalin |
| | | | 70/220 | Cyclohexane |
| 13 | 225 | 1,2-dimethyl-cyclohexane :methylcyclohexane | 0/6 | 1,2-dimethylcyclo-hexane |
| | | | 80/210 | Methylcyclohexane |
| 14 | 225 | O-diethylbenzene: p-diethylbenzene | 0/10 | O-diethylbenzene |
| | | | 120/200 | p-diethylbenzene |
| 15 | 225 | m-xylene: p-xylene | 0/15 | m-xylene |
| | | | 60/110 | p-xylene |
| 16 | 225 | 2-ethyltoluene: 4-ethyltoluene | 0/10 | 2-ethyltoluene |
| | | | 75/160 | 4-ethyltoluene |

EXAMPLES 17–24

The procedure of Examples 5–16 was repeated with the exception that the zeolite employed was HZSM-5. This zeolite was prepared in accordance with the procedure of Example 1. The results of these examples as well as the specific hydrocarbon mixtures employed are shown in Table 9.

TABLE 9

| ex. | Temp. (°C) | Components in Mixture (50/50) | Elution Time sec to sec | Component (>90% purity) [a] |
|---|---|---|---|---|
| 17 | 200 | 2,2-dimethylbutane: 2-methylpentane | 0/30 | 2,2-dimethylbutane |
| | | | 180/300 | 2-methylpentane |
| 18 | 250 | Isooctane: '3-methylpentane | 0/10 | Isooctane |
| | | | 210/360 | 3-methylpentane |
| 19 | 200 | Isooctane: 2,5-dimethylhexane | 0/10 | Isooctane |
| | | | 35/80 | 2,5-dimethylhexane |
| 20 | 250 | Decalin: cyclohexane | 0/5 | Decalin |
| | | | 70/220 | Cyclohexane |
| 21 | 250 | 1,2-dimethyl-cyclohexane :methylcyclohexane | 0/5 | 1,2-dimethylcyclo-hexane |
| | | | 80/210 | Methylcyclohexane |
| 22 | 200 | 0-diethylbenzene: p-diethylbenzene | 0/10 | O-diethylbenzene |
| | | | 115/200 | p-diethylbenzene |
| 23 | 200 | m-xylene: p-xylene | 0/15 | m-xylene |
| | | | 60/100 | p-xylene |
| 24 | 200 | 2-ethyltoluene: 4-ethyltoluene | 0/10 | 2-ethyltoluene |
| | | | 70/160 | 4-ethyltoluene |

EXAMPLE 25–28

Examples 25–28 are directed towards the separation of various xylene isomers both with and without ethylbenzene over a zeolite of the ZSM-5 type. In each of these examples about 4 grams of the zeolite prepared in accordance with the procedure of Example 1 was sized 30/60 mesh and then packed into a 5 ×⅜ inch diameter sorption column. The zeolite column was then activated and flowing helium at a flow rate of 100 ml/min. at 300°C and thereafter cooled to 175°C. A 100 microliter sample of the $C_8$ aromatic mixture was then injected into the helium stream immediately ahead of the sorbent column through a preheater zone 225°C. Elution of the various components in the exit helium stream were monitered and specific fractions were isolated from said exit helium stream in sample vials which were cooled to −80°C. The fractions were then removed and analyzed. The specific operating conditions as well as the results of these experiments are shown in Table 10.

TABLE 10

| Example | 25 | 26 | 27 | 28 |
|---|---|---|---|---|
| Starting Composition (Wt %) | | | | |
| Ethylbenzene | — | — | 8 | 12 |
| P-Xylene | 24 | 24 | 23 | 22 |
| M-xylene | 76 | 59 | 51 | 66 |
| O-xylene | — | 17 | 18 | — |
| Fraction trapped between | | | | |
| Elution Times of | 185 | 184 | 187 | 157 |
| secs to secs | 347 | 245 | 247 | 247 |
| Weight of Trapped Sample (mg) | 8 | 7 | 7 | 11 |
| Final Composition (Wt %) | | | | |
| Ethylbenzene | — | — | — | — |
| P-xylene | 98 | 98 | 98 | 98 |
| M-xylene | 2 | 2 | 2 | 2 |
| O-xylene | — | — | — | — |

From the above table, it can be seen that the novel procedure of this invention resulted in the separation of substantially pure p-xylene from various isomeric mixtures thereof and in both the presence and absence of ethyl benzene.

EXAMPLES 29–32

The procedure of Examples 25–28 was repeated with the exception that separation process was carried out at 150°C instead of 175°C. Additional operating conditions, as well as the results of these experiments are shown in Table 11.

EXAMPLES 33–38

The procedure of Examples 25–28 was repeated with the exception that a 200 microliter sample was employed in Examples 33–36 inclusive, and the separation was carried out at 175°C. For example 37–38, the temperature employed was 200°C and the sample size employed was 100 microliters.

Other specific operating conditions, as well as the results obtained are shown in Table 12.

Examples 39–42

The procedure of Examples 29–32 was repeated with the exception that a ZSM-8 zeolite prepared by the procedure of Example 41 was employed.

Other operational details, as well as the results are shown in Table 13.

EXAMPLES 43–47

In these examples a mixture comprising 14 Wt. % ethyl benzene, 25 wt. % p-xylene, and 61 wt. % m-xylene was charged to 3.6 grams of a 30/60 mesh HZSM-5 zeolite prepared in accordance with the procedure of Example 1. The zeolite was contained in a 5 × ⅜ inch columm and the temperature separation was carried out at 175°C. Helium at a flow rate of 100 ml/min. was employed in accordance with the procedure of Examples 25–28 and samples were trapped in vials at −80°C and analyzed. More detailed operating conditions as well as the results of the separation are shown in Table 14.

EXAMPLES 48–53

The procedure of Examples 43–47 was repeated with the exception that the zeolite employed was one of the ZSM-8 type prepared in accordance with the procedure of Example 4. The composition which was charged consisted of 14 wt. % ethylbenzene, 24 wt. % paraxylene and 62 wt. % metaxylene. The results of the separations, as well as more detailed operation conditions are shown in Table 15.

TABLE 11

| Example | Starting composition (wt. percent) | | | | Fraction trapped between elution time of—(secs. to secs.) | Weight of trapped sample (mg.) | Final composition (wt. percent) | | | |
|---|---|---|---|---|---|---|---|---|---|---|
| | Ethyl-benzene | p-Xylene | m-Xylene | o-Xylene | | | Ethyl-benzene | p-Xylene | m-Xylene | o-Xylene |
| 29 | | 24 | 76 | | 0 to 60 | 41 | | | 100 | |
| | | | | | 620 to 1,040 | 13 | | 100 | | |
| 30 | | 24 | 59 | 17 | 0 to 180 | 57 | | | 80 | 20 |
| | | | | | 550 to 1,020 | 12 | | 100 | | |
| 31 | 8 | 23 | 51 | 18 | 0 to 180 | 34 | | | 77 | 23 |
| | | | | | 600 to 960 | 8 | | 100 | | |
| | | | | | 1,180 to 2,100 | 3 | 100 | | | |
| 32 | 12 | 22 | 66 | | 0 to 180 | 34 | | | 100 | |
| | | | | | 570 to 900 | 8 | | 100 | | |
| | | | | | 1,500 to 2,100 | 1 | 100 | | | |

TABLE 12

| Example | Starting composition (wt. percent) | | | | Fraction trapped between elution time of—(secs. to secs.) | Weight of trapped sample (mg.) | Final composition (wt. percent) | | | |
|---|---|---|---|---|---|---|---|---|---|---|
| | Ethyl-benzene | p-Xylene | m-Xylene | o-Xylene | | | Ethyl-benzene | p-Xylene | m-Xylene | o-Xylene |
| 33 | | 24 | 76 | | 144 to 348 | 38 | | 99 | 1 | |
| 34 | | 24 | 59 | 17 | 162 to 335 | 31 | | 99 | 1 | |
| 35 | 8 | 23 | 51 | 18 | 119 to 229 | 26 | | 99 | 1 | |
| 36 | 12 | 22 | 66 | | 109 to 222 | 28 | | 98 | 2 | |
| 37 | 8 | 23 | 51 | 18 | 65 to 116 | 16 | | 97 | 3 | |
| 38 | 8 | 23 | 51 | 18 | 74 to 112 | 11 | | 97 | 3 | |

TABLE 13

| Example | Starting composition (wt. percent) | | | | Fraction trapped between elution time of—(secs. to secs.) | Weight of trapped sample (mg.) | Final composition (wt. percent) | | | |
|---|---|---|---|---|---|---|---|---|---|---|
| | Ethyl-benzene | p-Xylene | m-Xylene | o-Xylene | | | Ethyl-benzene | p-Xylene | m-Xylene | o-Xylene |
| 39 | | 24 | 76 | | 0 to 120 | 43 | | | 100 | |
| | | | | | 480 to 960 | 9.5 | | 100 | | |
| 40 | | 24 | 59 | 17 | 0 to 120 | 44 | | | 79 | 21 |
| | | | | | 480 to 1,020 | 7.8 | | 100 | | |
| 41 | 8 | 23 | 51 | 18 | 0 to 120 | 43 | | | 75 | 25 |
| | | | | | 420 to 840 | 13 | | 100 | | |
| | | | | | 1,200 to 1,980 | 0.5 | 100 | | | |
| 42 | 12 | 22 | 66 | | 0 to 120 | 35 | | | 100 | |
| | | | | | 420 to 780 | 8.9 | | 100 | | |
| | | | | | 1,080 to 2,040 | 1.7 | 100 | | | |

TABLE 14

| Ex. | Sample Size (μ) | Fraction Trapped between Elution Times of secs to secs | Final Composition (Wt %) | | |
|---|---|---|---|---|---|
| | | | Ethyl-benzene | p-xylene | m-xylene |
| 43 | 10 | 0  60 | — | — | 100 |
| | | 390  450 | — | 93 | 7 |
| 44 | 20 | 0  60 | — | — | 100 |
| | | 180  330 | — | 94 | 6 |
| 45 | 50 | 0  60 | — | — | 100 |
| | | 162  300 | — | 97 | 3 |
| | | 360  720 | 95 | — | 5 |
| 46 | 100 | 0  60 | — | — | 100 |
| | | 108  288 | — | 98 | 2 |
| | | 330  780 | 97 | — | 3 |
| 47 | 150 | 0  40 | — | — | 100 |
| | | 78  240 | 3 | — | 2 |
| | | 330  780 | 97 | — | 3 |

EXAMPLES 54–61

These examples will illustrate the separation of m-xylene from p-xylene.

In each of these examples a solution containing 24 parts by weight and 76 parts by weight of m-xylene were charged to 4.3 grams of a 30/60 mesh crystalline aluminosilicate prepared in accordance with the procedure of Example 2. The zeolite was contained in a 5 × ⅜ inch column and the temperature at which the separation was carried out was 150°. The $C_8$ aromatic sample was injected and vaporized at 225°C and the carrier was a helium stream at a flow rate of 100 ml/min. The eluted sample was trapped in glass vials at −80°C from the exit helium stream. More detailed operating conditions, as well as the results of these experiments are shown in Table 16.

EXAMPLES 62–65

The procedure of Examples 54–61 was repeated with the exception that the temperature at which the separation was carried out was 200°C instead of 150°C. Specific operating conditions, as well as the results thereof are shown in Table 17.

TABLE 15

| Ex. | Sample Size (μ) | Fraction Trapped between Elution Times of sec to sec | | Final Composition (Wt %) Ethyl-benzene | p-xylene | m-xylene |
|---|---|---|---|---|---|---|
| 48 | 10 | 0 | 60 | — | — | 100 |
| | | 168 | 360 | — | 100 | — |
| 49 | 20 | 0 | 30 | — | — | 100 |
| | | 162 | 318 | — | 84 | 16 |
| 50 | 50 | 0 | 30 | — | — | 100 |
| | | 144 | 288 | — | 100 | — |
| | | 378 | 660 | 100 | — | — |
| 51 | 100 | 0 | 30 | — | — | 100 |
| | | 120 | 288 | — | 100 | — |
| | | 304 | 600 | 100 | — | — |
| 52 | 150 | 0 | 30 | — | — | 100 |
| | | 78 | 240 | 5 | 95 | — |
| | | 318 | 600 | 100 | — | — |
| 52 | 200 | 0 | 30 | — | — | 100 |
| | | 240 | 600 | 100 | — | — |

TABLE 16

Separation of m-xylene (30%) and p-xylene (70%)

| Ex. | Sample Size (μ) | Fraction Trapped Between Elution Times of secs to secs | | Final Composition (Wt %) p-xylene | m-xylene |
|---|---|---|---|---|---|
| 54 | 25 | 0 | 20 | — | 100 |
| | | 450 | 960 | 100 | — |
| 55 | 50 | 0 | 30 | — | 100 |
| | | 450 | 960 | 100 | — |
| 56 | 100 | 0 | 30 | — | 100 |
| | | 360 | 960 | 100 | — |
| 57 | 200 | 0 | 30 | — | 100 |
| | | 360 | 960 | 100 | — |
| 58 | 300 | 0 | 30 | — | 100 |
| | | 180 | 960 | 100 | — |
| 59 | 400 | 0 | 30 | — | 100 |
| | | 72 | 900 | 100 | — |
| 60 | 500 | 0 | 30 | — | 100 |
| | | 90 | 900 | 100 | — |
| 61 | 600 | 0 | 30 | — | 100 |

TABLE 17

| Ex. | Sample Size (μ) | Fraction Trapped Between Elution Time of Secs to Secs | | Final Composition (Wt %) p-xylene | m-xylene |
|---|---|---|---|---|---|
| 62 | 50 | 0 | 12 | — | 100 |
| | | 48 | 120 | 97 | 3 |
| 63 | 100 | 0 | 18 | — | 100 |
| | | 36 | 120 | 97 | 3 |
| 64 | 200 | 0 | 12 | — | 100 |
| | | 21 | 114 | 98 | 2 |
| 65 | 300 | — | 9 | 2 | 98 |
| | | 24 | 120 | 99 | 1 |

What is claimed is:

1. A process for the selective separation of biphenyls selected from the group consisting of unsubstituted biphenyl non-quaternary carbon atom containing para substituted biphenyl and non-quaternary carbon atom containing para, para′ disubstituted biphenyl from a mixture of the same with at least one other substituted biphenyl which comprises contacting said mixture with a crystalline zeolitic material for a period of time sufficient to selectively sorb at least one biphenyl, said zeolitic material having the X-ray diffraction pattern as set forth in Table I of the specification and a composition, in terms of mole ratios of oxides, as follows:

$$0.9 \pm 0.2\ M_{2/n}O : W_2O_3 : 5\text{–}100\ YO_2 : z\ H_2O$$

wherein M is a cation, *n* is the valence of said cation, W is selected from the group consisting of aluminum and gallium, Y is selected from the group consisting of silicon and germanium, and *z* is from 0 to 40.

2. A process for the selective separation of para disubstituted aromatic isomers from a mixture of the same with at least one other isomeric disubstituted aromatic compound which comprises contacting said mixture with a crystalline zeolitic material for a period of time to sufficiently sorb said para isomers, sad zeolitic material having the X-ray diffraction pattern as set forth in Table I of the specification and a composition, in terms of mole ratios of oxides, as follows:

$$0.9 \pm 0.2\ M_{2/n}0 : W_20_3 : 5\text{–}100\ YO_2 : z\ H_2o$$

wherein M is a cation, *n* is the valence of said cation, W is selected from the group consisting of aluminum and gallium, Y is selected from the group consisting of silicon and germanium, and *z* is from 0 to 40.

3. The process of claim 2 wherein the zeolite is ZSM-5 and has an X-ray diffraction pattern selected from at least one of the cationic forms set forth in Table 2 of the specification.

4. The process of claim 2 wherein the zeolite is ZSM-8 and has an X-ray diffraction pattern as set forth in Table 4 of the specification.

5. A process for the selective separation of paraxylene from a mixture with at least one other isomeric xylene which comprises passing said mixture at a temperature of −50° to about 400°C with a crystalline aluminosilicate for a period of time to selectively sorb said paraxylene within the internal pore structure of said zeolite, said aluminosilicate having the X-ray diffraction pattern as set forth in Table I of the specification and a composition, in terms of mole ratios of oxides, as follows:

$$0.9 \pm 0.2\ M_{2/n}O : W_2O_3 : 5\text{–}100\ YO_2 : z\ H_2O$$

wherein M is a cation, *n* is the valence of said cation, W is selected from the group consisting of aluminum and gallium, Y is selected from the group consisting of silicon and germanium, and *z* is from 0 to 40.

6. The process of claim 5 wherein the temperature range is from 25° to 300°C.

7. A process for the selective separation of paraxylene from a mixture of the same with at least one other isomeric xylene which comprises contacting the same with a ZSM-5 type zeolite to preferentially sorb paraxylene thereafter recovering said paraxylene from the internal pore structure of said zeolite, said zeolite having the X-ray diffraction pattern as set forth in Table 1 of the specification and a composition, in terms of mole ratios of oxides, as follows:

$$0.9\pm0.2\ M_{2/n}O : W_2O_3 : 5\text{–}100\ YO_2 : z\ H_2O$$

wherein M is a cation, $n$ is the valence of said cation, W is selected from the group consisting of aluminum and gallium, Y is selected from the group consisting of silicon and germanium, and $z$ is from 0 to 40.

8. A process for the selective separation of paraxylene from a mixture of the same with at least one other isomeric xylene which comprises contacting the same with ZSM–5 at a temperature of 25°–300°C to preferentially sorb paraxylene thereafter recovering said paraxylene from the internal pore structure of said zeolite, said ZSM–5 having the X-ray diffraction pattern selected from at least one of the cationic forms set forth in Table 2 of the specification and a composition, in terms of mole ratios of oxides, a follows:

$$0.9\pm0.2\ M_{2/n}O : Al_2O_3 : 5\text{–}100\ SiO_2 : z\ H_2O$$

and M is selected from the group consisting of a mixture of alkali metal cations, especially sodium, and tetraalkylammonium cations, the alkyl groups of which preferably contain 2–5 carbon atoms.

9. A process for the selective separation of paraxylene from a mixture of the same with at least one other isomeric xylene which comprises contacting the same with ZSM–8 to preferentially sorb paraxylene thereafter recovering said paraxylene from the internal pore structure of said zeolite, said ZSM–8 having the X-ray diffraction pattern as set forth in Table 4 of the specification and a composition, in terms of mole ratios of oxides, as follows:

$$0.9\pm0.2\ M_{2/n}O : Al_2O_3 : 5\text{–}100\ SiO_2 : z\ H_2O$$

wherein M is at least one cation, $n$ is the valence thereof and $z$ is from 0 to 40.

10. The process of claim 8 wherein the ZSM–5 is in hydrogen form.

11. The process of claim 9 wherein the ZSM–8 is in hydrogen form.

* * * * *

PO-1050
(5/69)

UNITED STATES PATENT OFFICE
CERTIFICATE OF CORRECTION

Patent No. 3,699,182 Dated October 17, 1972

Inventor(s) JOHN CATTANACH

It is certified that error appears in the above-identified patent and that said Letters Patent are hereby corrected as shown below:

Column 4, line 53, Table 2, under heading HCl, "2.75" should be --2.74--; Column 5, line 21, Table 2, under heading HCl, "1.47" should be --1.57--; Column 5, line 39, Table 3, under heading Particularly Preferred, "10-50" should be --10-40--; Column 6, line 15, delete "865,472."; Column 6, line 43, Table 4, under heading I/I° first occurrence, "4" should be --5--; Column 15, line 6, "results are" should be --results obtained are--; Column 17, line 32, Table 15, under heading Ex. "52" should be --53--; Column 18, line 25, "sad" should be --said--;.

Signed and sealed this 27th day of March 1973.

(SEAL)
Attest:

EDWARD M.FLETCHER,JR.
Attesting Officer

ROBERT GOTTSCHALK
Commissioner of Patents